United States Patent [19]

Mentschel

[11] 4,018,573
[45] Apr. 19, 1977

[54] REACTOR FOR THE CATALYTIC CONVERSION OF HYDROCARBONS WITH A GAS CONTAINING OXYGEN TO FORM A FUEL GAS

[75] Inventor: Hellmuth Mentschel, Erlangen, Germany

[73] Assignee: Siemens Aktiengesellschaft, Munich, Germany

[22] Filed: June 23, 1975

[21] Appl. No.: 589,001

[30] Foreign Application Priority Data

June 28, 1974 Germany .......................... 2431207
May 15, 1975 Germany .......................... 2521730

[52] U.S. Cl. .................. 48/107; 23/288 K; 123/3
[51] Int. Cl.[2] ............ B01J 8/02; C01B 2/16; F02B 43/08
[58] Field of Search .......... 23/288 R, 288 K, 288 J, 23/281 US, 289; 48/103, 107; 123/3, 119 E

[56] References Cited

UNITED STATES PATENTS

| 1,000,768 | 8/1911 | Benham | 48/107 X |
| 2,235,401 | 3/1941 | Gier, Jr. | 48/103 X |
| 2,632,296 | 3/1953 | Houdry | 123/119 E X |
| R13,635 | 10/1913 | Constantinescu | 48/107 |

FOREIGN PATENTS OR APPLICATIONS 5,510  5/1927  Australia .................. 123/119 E

*Primary Examiner*—Joseph Scovronek
*Attorney, Agent, or Firm*—Kenyon & Kenyon Reilly Carr & Chapin

[57] ABSTRACT

A reactor having a reaction chamber with an inlet and outlet along with a heat exchanger designed as a cooler for the gas product has all of its walls which are swept by the hot starting materials or the product gas on the way from the inlet to the cooler made of an entirely non-metallic, heat resistant material which will not act as a catalyzing agent for the formation of undesired reaction products.

5 Claims, 2 Drawing Figures

REACTOR FOR THE CATALYTIC CONVERSION OF HYDROCARBONS WITH A GAS CONTAINING OXYGEN TO FORM A FUEL GAS

BACKGROUND OF THE INVENTION

This invention relates to reactors for generating gases in general and more particularly to an improved reactor useful in generating fuel gases for internal combustion engines through the catalytic conversion of hydrocarbons with a gas containing oxygen at elevated temperatures.

In equipment for carrying out a catalytic conversion for generating a gas in which a starting material in gaseous and/or atomized or evaporated liquid form is converted in a reactor not only the molecular collisions with a catalyst located in the reaction chamber must be considered but in addition all contact of the raw materials and the product gas with the reactor wall which can have catalytic effect must also be considered. In large reactor the ratio of the wall area to the surface area of the catalyst in the reaction chamber usually can be neglected. However, in smaller reactors such as those used in conjunction with internal combustion engines catalytic reactions may occur due to contact with the walls which can lead to the formation of undesired reaction products. As a result, it is particularly important in smaller reactors that such catalytic reactions be prevented.

Smaller sized reactors of the nature being referred to are used, for example, in the process disclosed in U.S. application Ser. No. 439,870 filed Feb. 6, 1974, by Wolfgang Frie et al. and assigned to the same assignee as the present invention, now abandoned in favor of Ser. No. 633,609 filed Nov. 20, 1975. In the disclosed apparatus a liquid fuel hydrocarbon is atomized or evaporated and supplied to the reaction chamber of a reformed gas generator with a gas containing oxygen admixed to it. The mixture is catalytically converted in the reaction chamber into a completely combustible fuel gas, i.e., reformed gas, which has a high octane number. The reformed gas is particularly well suited for the operation of an internal combustion engine since it requires no antiknock agents and the gas burns more completely with additional combustion air than does directly injected liquid fuel. As a result, the exhaust gases of the internal combustion engine operated using the reformed gas will contain considerably fewer harmful emissions than will an internal combustion engine operated directly with liquid fuel.

The oxygen containing gas is supplied only in such amounts as to result in the formation of methane, carbon monoxide and/or hydrogen. In other words, only a partial catalytic oxidation of the fuel takes place. In order to insure that the calorific value of the fuel gas is not reduced too much, the oxygen supply to the gas generator is throttled to an amount far below that required for combustion. It is well known that, in such greatly understoichiometric reactions of hydrocarbons with oxygen, soot formation will occur in the range of thermodynamic equilibrium. Such soot formation inside the reactor can be prevented through the use of suitable reactive fillings. However, danger exists that, at the prevailing temperatures, wall collisions will accelerate the establishment of the thermodynamic equilibrium and promote soot formation. In addition, for reasons of mechanical stability, the reactor housing of a reformed gas generator, particularly where it is to be used in a motor vehicle is normally made of metal or metal alloys such as stainless steel. However, these metals under some circumstances catalytically favor soot formation. Soot may form not only in the reaction chamber itself but also in the pipe lines and other components in which the hot fuel gas makes contact with a wall without the additional supply of oxygen. Furthermore, it must be remembered that only a limited amount of space is available for the installation of a reformed gas generator in a motor vehicle, that such a generator is subjected to mechanical stresses and that the expense of the production and servicing of the motor vehicle should not be increased substantially due to the use of a reformed gas generator. Such generators containing catalyts and having a specially designed wall defining the reaction chamber are known. For example, in a gas generator disclosed in U.S. Pat. No. 1,795,037 the reactants are conducted through metal tubes lined with porous, active graphite in which a catalytic action is described. Another reactor is disclosed in German Pat. No. 720,535, particularly on page 2, lines 17-58. The disclosed reactor is based on the assumption that a metal or metal alloy exists which can be used as a catalyst for the inner lining of the metal tubes. The metal tubes are disposed in a metal housing through which the exhaust gases of the internal combustion flow, the tube inlets followed in the reactor by a distribution zone. In this zone the reactant materials come in contact with the walls of the metal housing and undesired reactions then occur at the walls. Furthermore, there is a danger that adhesion of the catalytic layers at the metal of the tube cannot stand stresses such as those produced by the large temperature changes.

Another reactor disclosed in German Pat. No. 428,157 page 2, lines 32-35 contains metal tubes which are heated by exhaust gases from outside and includes, along with the reactor jacket and feed lines a metal suitable as a catalyst. Here it is also assumed that suitable metals or metal alloys exist. However, for many reactions there is a serious question as to whether or not metallic materials having the required catalytic action and which do not produce undesired byproducts are available.

In view of these various problems, the need for an improved reactor which is particularly useful for forming a fuel gas for internal combustion engines becomes evident.

SUMMARY OF THE INVENTION

The present invention has as its object provision of a reactor of the general type described above which avoids the catalytic generation of undesired byproducts due to wall collisions, and in particular avoids the formation of soot. Furthermore, it is the object of the invention to provide such a reactor which is as small as possible in volume, is easy to produce and service, and is capable of being subject to severe loading.

The present invention solves these problems by providing a heat exchanger which is designed as a cooler for the product gas and by constructing all walls swept by hot raw materials or the product gas on way from the inlet to the cooler of non-metallic, heat resistant materials which will not result in catalytic reactions and the formation of undesired reaction products.

The raw materials such as gasoline and a gas containing oxygen, e.g., a mixture of air and exhaust gas, are first introduced into the reactor at low temperature and are then heated and converted by the elevated temperatures prevailing in the reaction chamber. The hot product gas is then cooled by the heat exchanger which is designed as a cooler and leave the reactor at a low temperature again. The tubing system connected to the reactor may consist of any desired material since the media flow therethrough will not experience any further conversions worth mentioning because they are at low temperatures in all cases. In the reactor, however, the media which is reactionable due to the higher temperatures only come into contact with the reactor charge which may be made up of a plurality of catalytic bodies, or with a non-metallic wall, so that desired catalytic conversion of the hot raw materials is not disturbed by an unfavorable catalytic action at the wall. As a result undesired further conversion of the product gases is also prevented. The proper wall materials will depend on the type of materials participating in the reaction and the temperatures prevailing within the reactor. In many cases quartz glass is a suitable inert material exerting no catalytic effect on the substances in the reactor. Densely sintered ceramic materials are particularly well suited for thermal stresses up to 1900° C and for extreme stresses due to fast temperature changes. Since hydrocarbon conversions of the type mentioned above requiring the sootless conversion of a hydrocarbon into a gas mixture containing methane, carbon monoxide and/or hydrogen through mixing with a gas containing oxygen are often catalyzed using aluminum oxide, the walls will preferably be made of densely sintered ceramic material containing $Al_2O_3$. Suitable for this purpose are densely sintered ceramics containing Cordierite, casting porcelain, high strength porcelain containing corundum and corundum ($\alpha$-$Al_2O_3$), alone. An additional component which is catalytically active can be applied to these materials by impregnation or the like prior to sintering. In contrast to inert materials, such a material will be catalytically active but only for desired and not for undesired reactions promoting the partial oxidation of hydrocarbons without catalyzing a soot formation at the same time.

In one illustrated embodiment of the reactor the heat exchanger is disposed in a multiple wall jacket at least partially enclosing the reaction chamber. A particularly compact unit comprising the reaction chamber and a cooler for the product gas is thereby obtained.

In accordance with the present invention it is further advantageous if the jacket contains an intermediate wall consisting of heat resistant material that does not catalyze the formation of an undesired reaction product and which conducts the hot product gas discharging from the reaction chamber first along the inner wall to the cooler and then along the outer wall of the reactor. In such an embodiment, the inner wall is kept at an elevated temperature by the hot product gas sweeping past it and preventing the creation in the reaction chamber of zones where only incomplete conversion can take place due to the temperature being too low because of cooling. As a further advantage, the discharging hot product gas first comes into contact only with a heat resistant material which does not catalyze the formation of undesired reaction products and makes contact with the shock resistant material of the outer wall, e.g., the metal housing of the reactor, only after being cooled down in the cooler. Such an intermediate wall may consist of the same material as the inner wall for example.

In this connection, it is further advantageous that the outer wall of the jacket be designed as a housing made of shock resistant materials to surround the reactor. Specifically, a housing such as stainless steel can be used. The use of metal for the housing is not objectionable since the product comes into contact therewith only after it is cooled in the heat exchanger. This design results in a reactor/heat exchanger unit having a small volumn and which can be subjected to severe loads. A reactor of this nature is particularly well suited for use in the engine compartment of a motor vehicle having an internal combustion engine which is to be fed with the product gas of the reactor.

It is furthermore of great advantage to mechanically and rigidly interconnect the reactor components made of different material only in the vicinity of the cooler. Such a connection, which may be a screw connection, will then be protected from high temperatures and stresses due to severe temperature changes. At the same time, however, the different materials can expand in an unhindered manner according to the different thermal stresses and the coefficients of thermal expansion. Preferably, the heat exchanger acting as a cooler for the product gas will be installed preceding the inlet to the reaction chamber to also act to preheat the raw materials. For example, the jacket cavity may be equipped with a plurality of intermediate walls through the which the product gas and raw materials are conducted in a counterflow manner. Specifically, in accordance the an illustrated embodiment, it is advantageous for the cooler to contain an annular canal for the raw materials with passage openings to the reaction chamber. The raw materials will be evenly distributed in the annular canal with complete pressure equalization so there is assurance of a homogenous filling over the entire catalyst profile. The hydrocarbons can also be conducted in liquid form into the heat exchanger and evaporated by the heat of the product gas which then effectively cooled at the same time.

DETAILED DESCRIPTION OF THE PREFERRED EMBODIMENT

Figure 1:
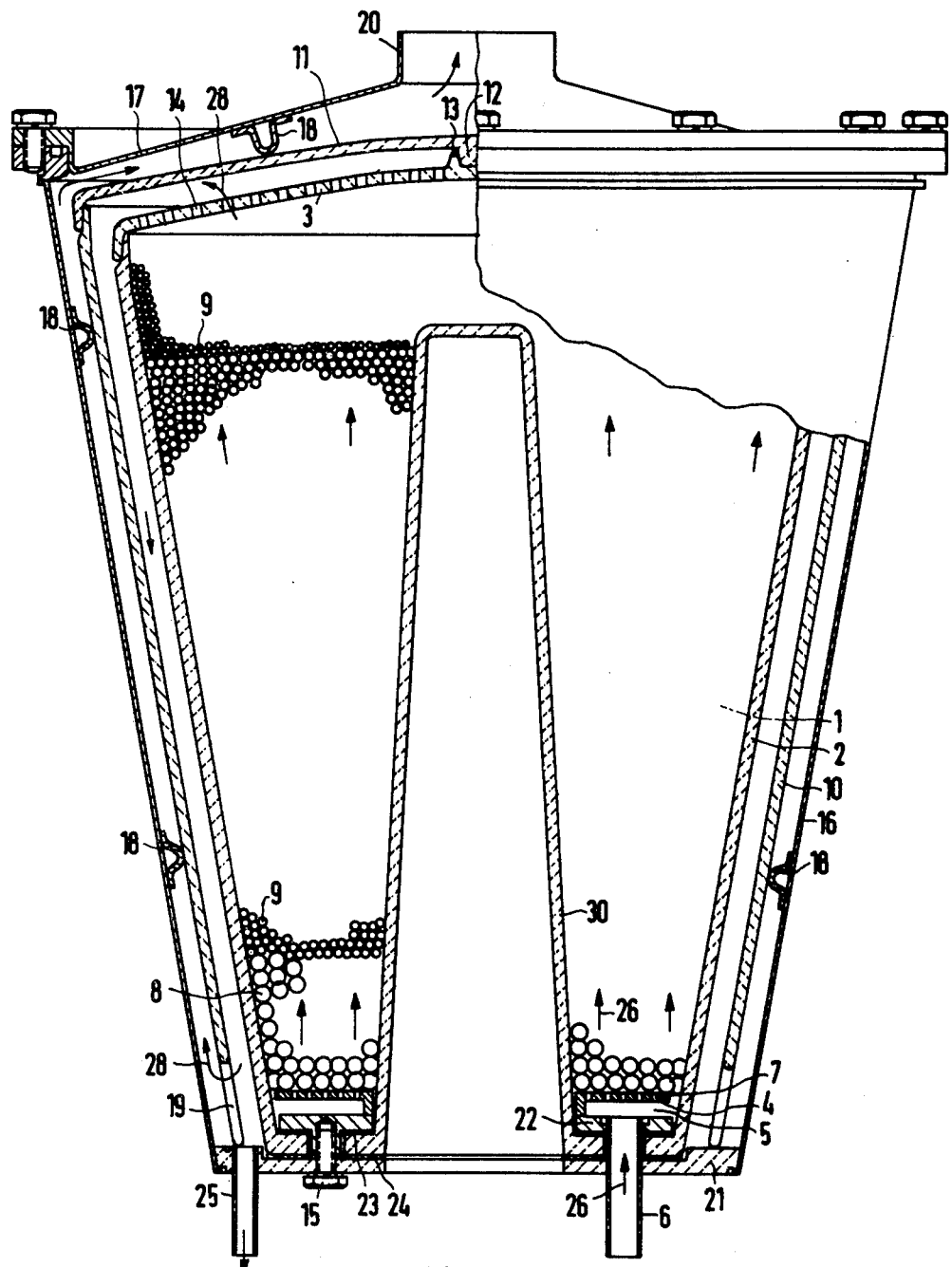
FIG. 1 is a partial cross-sectional side view of a first embodiment of the reactor of the present invention.

FIG. 1 illustrates a first embodiment of the present invention. The reactor illustrated includes a reaction chamber 1 enclosed on its outside by inner reactor wall 2 having a cover 3. A portion 30 of the inner reactor wall 2 has the shape of an inverted conical can. This portion 30 may be produced as an integral part of the wall 2 or may be produced and fitted as a separate part and used to also form the bottom of the chamber. An insert 4 rests in the bottom of the chamber 1. The purpose of the inverted portion 30 centrally located in the reaction chamber is to permit location of a supplemental heater therein which can be used to maintain the temperature of the reaction chamber. The insert 4 in the bottom of the chamber contains an annular canal 5 terminating in one or more supply lines 6 through which the raw materials to be converted in the chamber are supplied. The annular canal 5 communicates with the reaction chamber 1 by means of a plurality of apertures 7 in the top thereof. Within the reaction chamber 1 are a plurality of porous hollow $Al_2O_3$ balls 8 and 9 providing the catalytic charge for the chamber 1. The side wall 2 of the chamber is concentrically enclosed by a conical intermediate wall 10 upon which another cover 11 rests. The cover 11 has a projection 12 which engages a ring shaped fitting 13 on the cover 3. This maintains the intermediate wall 10 and its cover 11 properly spaced from the inner wall 2 and cover 3 and concentric therewith. The space between the inner wall 2 and intermediate wall 10 is in communication with the reaction chamber 1 through apertures 14 in the cover 3.

At its bottom the reaction chamber wall 2 is fastened to a conically shaped outer metal housing 16 by means of a screw connection 15. The outer conical metal housing 16 has a cover 17 flanged thereto. The housing 16 and its cover 17 include springs or spacers 18 by which the intermediate wall 10 and its cover 11 are fixed in the proper position. The space between the housing 16 and the intermediate wall 10 communicates with the space between the intermediate wall 10 and inner wall 2 by means of slots 19 at the lower edge of the intermediate wall 10. A discharge nipple 20 is installed in the center of the cover 17 to permit discharge of the product gas.

In the illustrated embodiment a mechanically strong connection and excellent centering of the reaction chamber including its wall 2 and wall 30 with the housing 16 is obtained by clamping the bottom of the chamber between a base plate 21 of the housing 16 and a metal ring 22 using the screws 15. In order to obtain a better seal between the base plate 21 and the chamber bottom along with obtaining a good seal between the chamber body and the metal ring 22, sealing rings 23 and 24 are inserted. If the portion 30 is a separate part this connection will also insure that it is retained in a central position. In addition, the insert 4 is connected to the metal ring 22 through a serration and mounted centrally through the part 30. Thus, displacement of the individual reactor parts relative to each other cannot come about due to vibration.

The preferred material for housing 16 with base plate 21 and cover 17 is steel, specifically stainless steel. Insert 4 along with the wall 2, the intermediate wall 10 and covers 3 and 11 will preferably be made of corundum or another dense ceramic material containing aluminum oxide. In addition, the wall 2 can be impregnated with active metal components.

The hydrocarbons to be supplied to the reactor, e.g., gasoline, may be atomized or evaporated and mixed with a gas containing oxygen, e.g., fresh air prior to entering the intake 6. In doing so a temperature not exceeding 150° to 200° C should be used.

A relatively cool mixture of this nature entering the annular canal 5 cools the insert 4, the metal ring 22, the bottom of the reaction chamber wall 2, the base plate 21 of the metal housing and the lowermost solid corundum balls 8. Because of this, these portions of the reaction chamber act as a cooler for the product gas flowing through the jacket. It should be noted, however, that the hydrocarbons may also be supplied in liquid form into the annular canal to be evaporated therein by the balls of the lowermost corundum charge thereby even further cooling the product gas. Reaction products which condense in this cooling zone can be removed through a nipple 25 mounted to the base plate 21 for that purpose.

The raw materials enter the annular canal 5 and the reaction chamber 1 in the direction of the arrows 26 and are preheated. After conversion in the reaction chamber hot product gases leave the reaction chamber through the openings 14 in the cover 3 and are conducted through the multiple wall jacket first in the direction of arrows 28 along the outside of the wall 2 which defines the reaction chamber to the cooler portion provided at the inlet of the reaction chamber. In this process the hot product gases raise the temperature of the reaction chamber wall and thus reduce heat losses therealong. While the raw materials are being heated, the product gas is now being cooled and subsequently flows along the metal housing 16 to the reactor discharge nipple 20.

As a result, a reactor according to the present invention of small structural size exhibits heat insulation of the reaction chamber and performs the function of a heat exchanger while still permitting conversions to be carried out at high temperatures without the danger of the formation of undesired reaction products due to catalytic action at the wall. The reactor of the present invention can be subjected to severe temperature changes and temperatures up to 1900° C without destruction by thermal stresses. Furthermore, it is protected from mechanical destruction by the metal housing 16.

Figure 2:
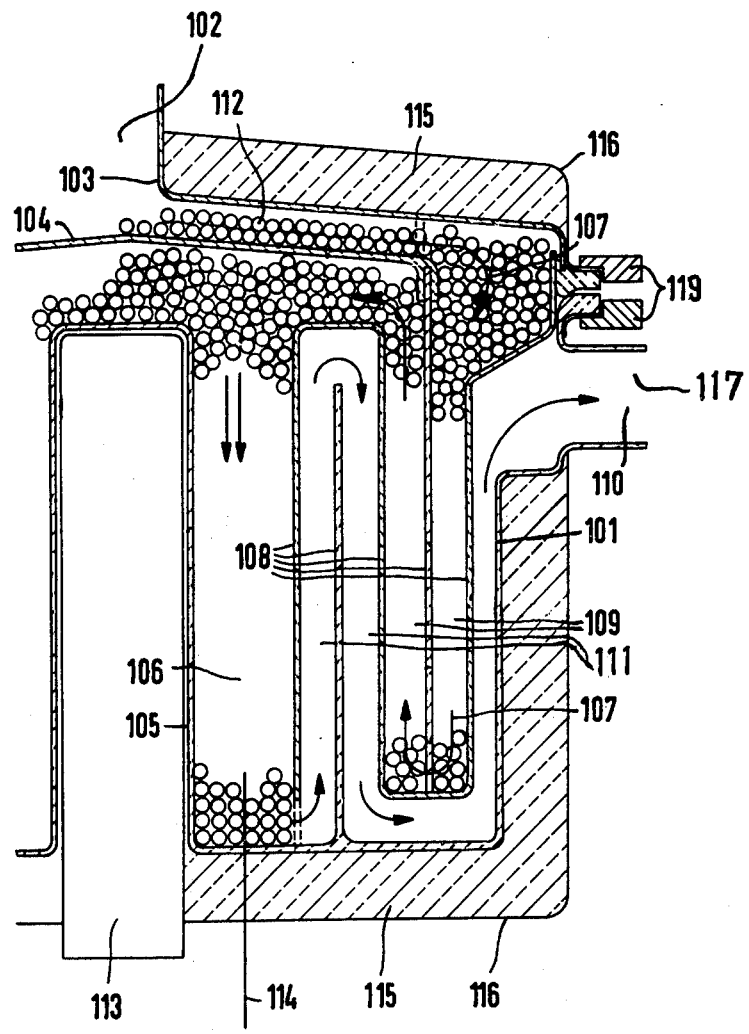
FIG. 2 is a similar view of a section of a second embodiment of the present invention.

FIG. 2 illustrates a second embodiment of the present invention. The reactor, only half of which is shown, is enclosed by an outer wall 101 having a cover 103 containing a central inlet 102. The bottom of the wall 101 contains a recess which supports a post 105 protruding axially therein and which is surrounded by a reaction chamber 106. Raw materials flow through the inlet 102 and are then conducted radially toward the outside. They are then conducted in the direction of arrows 107 through a system of concentric channels 109 formed by a plurality of concentric partitioning walls 108. They finally reach chamber 106 in which they are converted. The product gas flows through a plurality of concentric channels 111 formed by the same walls 108 along with additional walls 108 until it reaches the outlet 117. Through this arrangement the hot product gas flows alongside the same walls 108 on the opposite side from the raw materials, heating the raw materials and at the same time being cooled itself so that by the time it reaches the outlet 117 it is cooled and so that the raw materials upon reaching the chamber 106 are properly preheated. As with the previous embodiment the reaction chamber contains a catalyst in the form of a plurality of spherical, porous, hollow balls. Preferably these have the crystal structure of the α-modification of Al$_2$O$_3$, a diameter from 3 to 5 mm and a specific bulk gravity of 0.4 kg/L. In order to obtain better mixing and preheating of the raw materials, the annular channels 109 through which the raw materials are also filled with corundum balls.

The generation of a gas having an approximately constant composition requires not only that the hydrocarbons and oxygen containing gas be supplied to the reactor in an approximately constant quantitative ratio but also requires that contamination or clogging of the catalyst due to soot formation at the walls of the reaction chamber or the supply lines be prevented. Should such soot formation form the catalytic activity would be decreased substantially. Since thermal decomposition and the formation of undesired reaction products such as soot associated therewith can occur even at temperatures as low as 250° C, the raw materials are conducted into the reactor at a constant mixing ratio and the lowest possible temperature, i.e. the outside temperature. From the lowest to the highest reaction temperature all chemical reactions are controlled catalytically. For this reason the heated raw materials and the hot product gas should come in contact only with material of suitable or negligible catalytic activity. In other words, decomposition with soot formation caused by the thermal condition should be avoided. As noted above, a densely sintered aluminum oxide which may be impregnated with catalytically active substances forms a suitable wall material exhibiting catalytic activity which is suitable for the conversion of hydrocarbons. The type of substance which can be used is described, for example, in U.S. Pat. No. 3,878,130. It should be noted that this material has a high heat conductivity of approximately 18 kcal $\times h^{-1} \times m^{-1} \times C^{o-1}$ at 200° C and approximately 6 kcal $\times h^{-1} \times m^{-1} \times C^{o-1}$ at 800° C and thus provides a good heat exchange between the hot product gas and cool raw material mixture.

The reactor should be designed so that the maximum reaction temperature is reached but not substantially exceeded at maximum load. At a lesser load the desired temperature in the reaction chamber can be maintained using a supplemental electric heater accommodated in the in 105. A thermocouple 114 is inserted into the reaction chamber 106 to measure the actual temperature and control the electric heater in conventional fashion as a function of the measured temperature. In the embodiment of FIG. 2, the outer wall 101 and its cover 103 are also enclosed by a layer of insulating material 115 and metallic housing 116. The metallic housing is joined to the ceramic parts 101 and 108 of the reactor with a flange ring 119. The reactor thus assembled can easily be taken apart since it consists only of the cover 103, a ceramic insert forming the partitioning walls 108 and the metallic housing 116.

As with the previous embodiment, the reactor of FIG. 2 with its walls 101 and 108 produced of ceramic components has a heat resistance up to about 1900° C permitting the regeneration of the reactor, e.g., by burning off contaminants, without reducing the resistance or catalytic activity of the aluminum oxide. In addition to its wear resistance and its high resistance to temperature changes, a reactor according to this design has a small structural size and great mechanical strength.

Thus, an improved reactor or the catalytic conversion of hydrocarbons, particularly useful with internal combustion engines has been shown. Although specific embodiments have been illustrated and described, it will be obvious to those skilled in the art that various modifications may be made without departing from the spirit of the invention which is intended to be limited solely by the appended claims.

I claim:

1. In a reactor for the generation of a gas by the catalytic conversion of hydrocarbons with a gas containing oxygen at elevated temperatures, said reactor having a reaction chamber filled with a catalyst charge with an inlet for raw materials and an outlet for the product gas, the improvement comprising:
  a. a closed housing for said reactor;
  b. an enclosed intermediate wall disposed within said housing and spaced therefrom so as to form a first space between itself and said housing, said intermediate wall being made of a non-metallic, heat resistant material which will not catalyze the formation of undesired reaction products;
  c. an enclosed inner wall disposed within said intermediate wall and spaced therefrom with a second space formed between said intermediate wall and said inner wall, said inner wall defining the reaction chamber, said inner wall also being of a non-metallic, heat resistant material which will not catalyze the formation of undesired reaction products;
  d. means for coupling the inlet for raw materials directly into one end of said reaction chamber and;
  e. at least one first opening in said intermediate wall at the portion thereof closest to said one end of said reaction chamber so as to permit said first and second spaces on opposite sides thereof to be in communication with each other;
  f. means for coupling the outlet for the gas to said first space;
  g. at least one second opening in said inner wall permitting communication between said reaction chamber and said second space at the other end of said reaction chamber, whereby raw materials will flow through said reaction chamber and product gas will flow out of said second opening into said second space, through said second space to said first opening and then to said first space, after which it will flow to said outlet for the product gas whereby the flow of said product gas exiting said reaction chamber along said inner wall will be in a heat exchanging relationship with the raw material gas flowing through said chamber to aid in the reaction, with said product gas being cooled at the same time.

2. Apparatus according to claim 1 wherein said inner and intermediate walls consist of a ceramic containing aluminum oxide.

3. Apparatus according to claim 1 wherein said closed housing is a metal housing enclosing the reactor.

4. Apparatus according to claim 1, further comprising means joining said metal housing to said inner wall in a rigid mechanical manner only in the vicinity of said one end of said reaction chamber.

5. Apparatus according to claim 4 wherein said means for coupling the inlet for raw materials directly into said one end of said reaction chamber comprise an annular canal disposed at said one end of said reaction chamber having passage openings therein to supply said raw materials into said reaction chamber.

* * * * *